United States Patent
Kowarz et al.

(10) Patent No.: US 12,460,968 B2
(45) Date of Patent: Nov. 4, 2025

(54) LENSLESS IMAGER FOR LASER DETECTION

(71) Applicants: MicroAdventure Technologies LLC, Henrietta, NY (US); BlackBox Biometrics, Rochester, NY (US)

(72) Inventors: Marek Kowarz, Henrietta, NY (US); Angela D'Orazio, Penfield, NY (US)

(73) Assignees: MicroAdventure Technologies, Henrietta, NY (US); BlackBox Biometrics, Rochester, NY (US)

( * ) Notice: Subject to any disclaimer, the term of this patent is extended or adjusted under 35 U.S.C. 154(b) by 584 days.

(21) Appl. No.: 17/475,518

(22) Filed: Sep. 15, 2021

(65) Prior Publication Data

US 2022/0170783 A1     Jun. 2, 2022

Related U.S. Application Data

(60) Provisional application No. 63/080,149, filed on Sep. 18, 2020.

(51) Int. Cl.
    *G01J 1/42*     (2006.01)
    *G01J 1/04*     (2006.01)
    (Continued)

(52) U.S. Cl.
    CPC .......... *G01J 1/4257* (2013.01); *G01J 1/0407* (2013.01); *G01J 1/44* (2013.01); *G01J 3/502* (2013.01);
    (Continued)

(58) Field of Classification Search
    CPC .......... G01J 1/4257; G01J 1/0407; G01J 1/44; G01J 3/502; G01J 2001/448; G01J 9/00;
    (Continued)

(56) References Cited

U.S. PATENT DOCUMENTS

| | | | | |
|---|---|---|---|---|
| 5,387,973 A | * | 2/1995 | Sillitto | G01J 1/4257 356/521 |
| 5,731,874 A | * | 3/1998 | Maluf | G01J 3/2803 257/E27.129 |

(Continued)

FOREIGN PATENT DOCUMENTS

DE     102007024051 A1 * 11/2008     ............. G01S 3/782

OTHER PUBLICATIONS https://www.olympus-lifescience.com/en/microscope-resource/primer/lightandcolor/diffraction/ (Year: 2017).*

(Continued)

*Primary Examiner* — Michelle M Iacoletti
*Assistant Examiner* — Judy Dao Tran
(74) *Attorney, Agent, or Firm* — Louis S. Horvath

(57) ABSTRACT

An apparatus for characterization of one or more light sources, has an image sensor array that defines an image plane having an imaging area. An aperture spaced apart from the image plane defines the field of view that includes, for each of the one or more light sources, a corresponding incident light path that lies along a central ray beginning at the corresponding light source, extending through a center of the aperture, and terminating at the image plane. A diffraction grating forms, on the image sensor array, for each corresponding light source, a light pattern having at least a zeroth diffraction order and a first diffraction order, wherein the zeroth diffraction order is a geometrical projection of the aperture along the central ray. A control logic processor identifies a wavelength range and angular direction within the field of view for at least one of the light sources.

19 Claims, 24 Drawing Sheets

(51) Int. Cl.
*G01J 1/44* (2006.01)
*G01J 3/50* (2006.01)
*G01S 3/781* (2006.01)
*G02B 27/42* (2006.01)
*G01J 1/06* (2006.01)
*G01S 3/784* (2006.01)
*G01S 7/48* (2006.01)
*H01S 3/00* (2006.01)
*H10D 99/00* (2025.01)

(52) U.S. Cl.
CPC .......... *G01S 3/781* (2013.01); *G02B 27/4244* (2013.01); *G01J 1/06* (2013.01); *G01J 2001/448* (2013.01); *G01S 3/784* (2013.01); *G01S 7/4804* (2013.01); *G02B 27/4277* (2013.01); *H01S 3/0014* (2013.01); *H10D 99/00* (2025.01)

(58) Field of Classification Search
CPC .. G01J 1/06; G01S 3/781; G01S 3/784; G01S 7/4804; G02B 27/4244; G02B 5/005; G02B 27/4277; H01S 3/0014; H10D 99/00
See application file for complete search history.

(56) References Cited

U.S. PATENT DOCUMENTS

| | | | | |
|---|---|---|---|---|
| 6,118,119 A * | 9/2000 | Ruschin | ................ | G01J 3/0259 250/237 G |
| 7,446,860 B1 * | 11/2008 | Campbell | ............... | G01S 17/02 356/4.03 |
| 7,456,940 B2 * | 11/2008 | Crow | ................... | G01J 3/0294 356/73 |
| 7,982,171 B2 | 7/2011 | Katayama | | |
| 9,134,174 B2 | 9/2015 | Jungwirth | | |
| 9,655,525 B2 | 5/2017 | Lee | | |
| 10,228,451 B2 | 3/2019 | Chankaya et al. | | |
| 10,267,889 B1 | 4/2019 | Ihns | | |
| 10,365,162 B2 | 7/2019 | McNulty et al. | | |
| 10,690,543 B1 | 6/2020 | Wo et al. | | |
| 11,579,014 B1 * | 2/2023 | Zhang | .................. | H04B 10/118 |
| 2002/0186741 A1 * | 12/2002 | Kleinschmidt | ...... | B23K 26/705 372/57 |
| 2004/0104334 A1 * | 6/2004 | Gal | ....................... | G02B 13/06 250/203.6 |
| 2008/0001064 A1 | 1/2008 | Thomas et al. | | |
| 2015/0060683 A1 * | 3/2015 | Gnausch | ................ | G01J 1/4257 250/372 |
| 2015/0331082 A1 * | 11/2015 | Zollars | .................... | G01S 3/781 250/578.1 |
| 2018/0106900 A1 * | 4/2018 | Droz | ..................... | G01J 1/0437 |
| 2018/0359460 A1 * | 12/2018 | Pacala | ................... | G01S 7/4816 |
| 2019/0072976 A1 * | 3/2019 | Bell | ...................... | G05D 1/0236 |
| 2019/0094362 A1 | 3/2019 | Choiniere | | |
| 2019/0271652 A1 * | 9/2019 | Zhao | ...................... | G01N 33/24 |
| 2019/0339491 A1 * | 11/2019 | Chang | ................ | G02B 13/0045 |
| 2019/0393670 A1 | 12/2019 | Yufune et al. | | |
| 2020/0098486 A1 * | 3/2020 | Coenen | ............... | G03F 7/70158 |

OTHER PUBLICATIONS

Johnston et al, "Calibration standard for laser beam profilers: method for absolute accuracy measurement with a Fresnel diffraction test pattern", 1996, Applied Optics, vol. 35, No. 1, pp. 1719-1734 (Year: 1996).*

Chen, "Lensless coherent diffraction imaging with a Fresnel diffraction pattern", 2012, Acta Physica Sinica, vol. 16, No. 24 (Year: 2012).*

S.Sailaja, V. Arora, S.R. Dumbhare, P.A. Naik, P.D. Gupta, D.A. Fedin, A.A. Rupasov, A.S. Shikanov, "A simple XUV transmission grating spectrograph with sub-angstrom resolution for laser-plasma studies", Meas. Sci. Technol. (1998) UK, pp. 1462-1468.

* cited by examiner

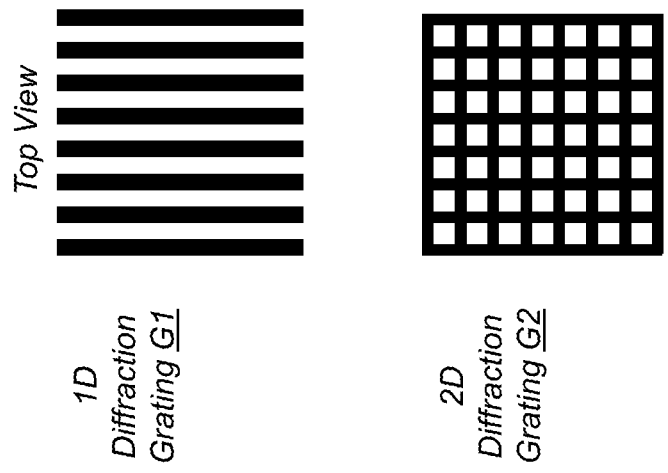

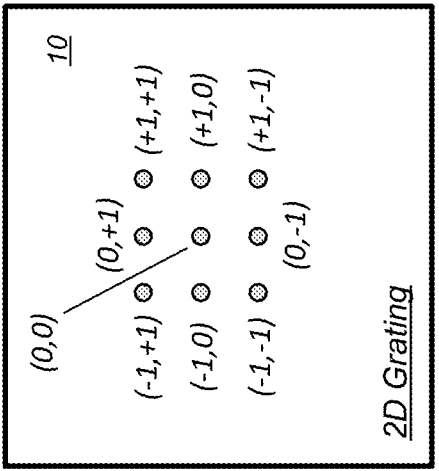
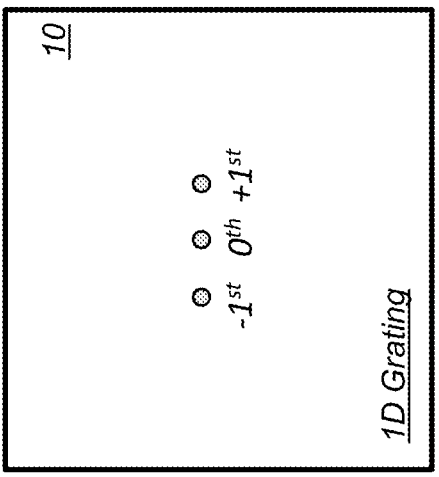
FIG. 6A

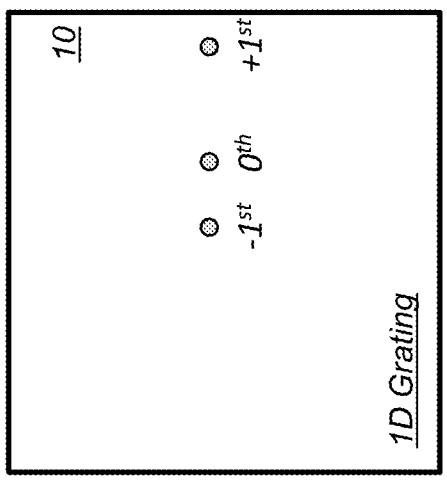
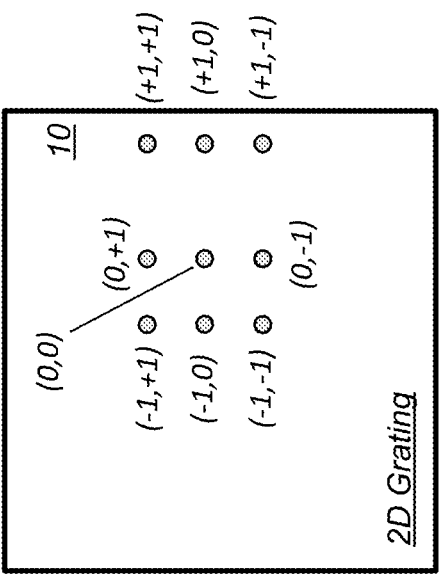
FIG. 6B

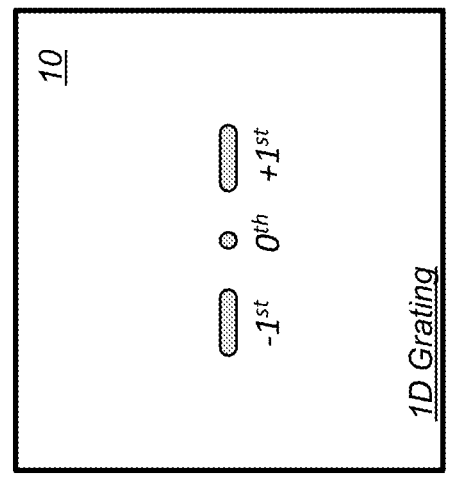
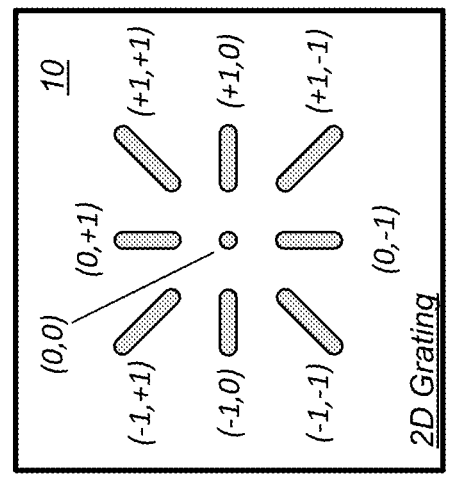
FIG. 7A

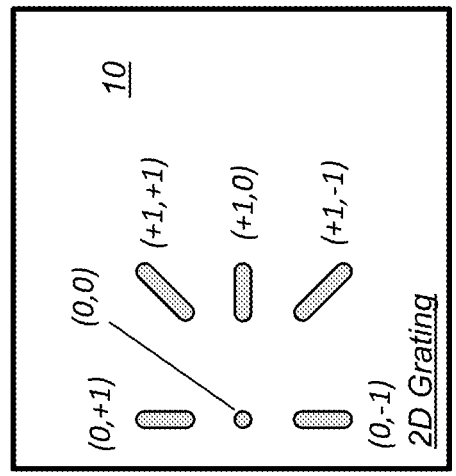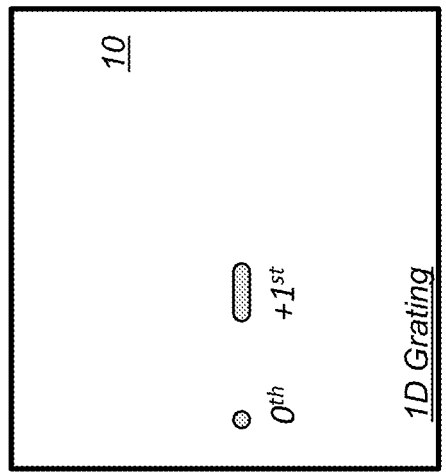
FIG. 7B

Sensor Design Example

| Total Effective Pixels | 3096 (H) x 2080 (V) |
|---|---|
| Pixel Size | 2.4 um (H) x 2.4 um (V) |
| Wavelength Range | 400-1000 nm |
| Field of View | > 120° x 100° |
| Image Region | 7.4 mm x 5.0 mm |
| Aperture to Image Sensor Distance | 1.6 mm |
| Aperture Size | 0.2 mm |
| Grating Pitch | 3000 nm |

*FIG. 10A*

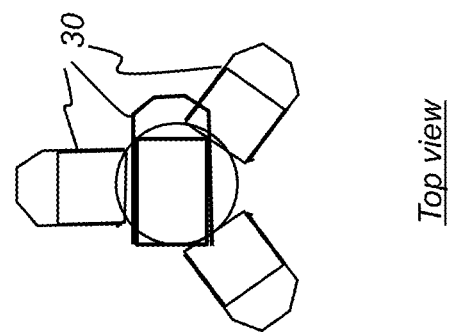
Top view
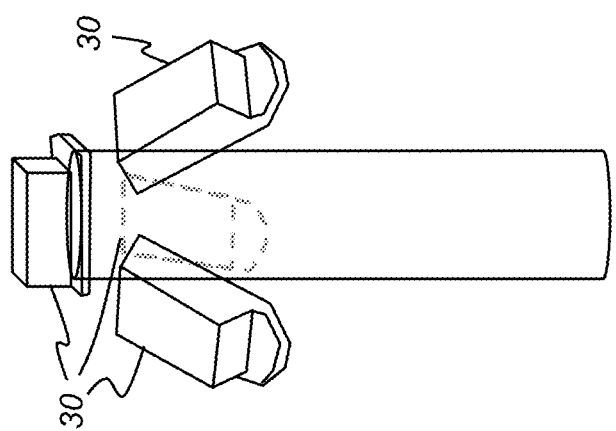
FIG. 15

LENSLESS IMAGER FOR LASER DETECTION

The present application claims the benefit of U.S. Provisional application Ser. No. 63/080,149, provisionally filed on Sep. 18, 2020 entitled "LENSLESS IMAGER FOR LASER DETECTION" in the names of Marek Kowarz et al., incorporated herein by reference in its entirety.

FIELD

The present disclosure generally relates to wide field-of-view laser detection apparatus and more particularly to a laser detection device that employs diffraction to determine laser source location, intensity, and wavelength.

BACKGROUND

There is increasing awareness in the importance of laser detection and warning systems in military applications, as well as in commercial flight, and industrial fields. Laser light energy can be directed toward personnel and equipment in laser attacks, posing increasing risk to infantry and to air and vehicle crews. Modern battlefield technology, using techniques such as laser range finding, missile guidance, and directed energy weapons, also threaten the safety of equipment and personnel.

Rapid detection of the source and characteristics of laser light is critical in supporting response and mitigation to ensure the safety of personnel at risk for laser exposures. While laser detection systems have been developed for mounting on helicopters and ground combat vehicles, their relative cost and factors of size, weight, and power (SWaP) render existing solutions unacceptable for personnel protection in any type of wearable system. Thus, to date, there is no commercially available system for portable, personal laser threat detection.

SUMMARY

The Applicants address the problem of wearable laser detection. With this object, the Applicants describe apparatus for laser detection that is smaller, lighter, and at lower cost than existing solutions, that is capable of high levels of accuracy, and that overcomes many of the shortcomings of other proposed solutions, as outlined previously in the background section.

The Applicants' solution provides a wide field-of-view (FOV) laser detection device that employs diffraction optics to effectively and quickly distinguish laser light from broadband light sources, including bright sunlight, headlights and LED sources, such as flashlights. Advantageously, the Applicants' system does not require conventional refractive optical systems that employ large wide field-of-view curved lenses or that use curved reflector surfaces for light shaping and redirection; instead, planar optical surfaces are used for light transmission and protection of internal imaging components. The Applicants' device employs sensors and light-handling components that can be fabricated at wafer scale with semiconductor and related microfabrication processes and equipment.

From an aspect of the present disclosure, there is provided an apparatus for characterization of one or more light sources over a field of view, comprising:
(a) an image sensor array that defines an image plane having an imaging area;
(b) an aperture spaced apart from the image plane and disposed to define the field of view that includes, for each of the one or more light sources, a corresponding incident light path that lies along a central ray beginning at the corresponding light source, extending through a center of the aperture, and terminating at the image plane, and wherein the aperture has a light-transmitting area smaller than the imaging area;
(c) a diffraction grating disposed in each of the incident light paths and configured to form, on the image sensor array, for each corresponding light source, a light pattern having at least a zeroth diffraction order and a first diffraction order of light from the light source, wherein the zeroth diffraction order is a geometrical projection of the aperture along the central ray; and
(d) a control logic processor in communication with the image sensor array and configured to provide a signal that identifies at least a wavelength range and an angular direction within the field of view for at least one of the light sources according to the corresponding light pattern.

DRAWINGS

FIG. 5 compares structure of a portion of a 1D diffraction grating with a portion of a 2D diffraction grating.

FIGS. 6A and 6B are simplified schematic diagrams, from the image plane, showing diffraction of on-axis and off-axis laser light, for 1D and 2D diffraction gratings, respectively.

FIGS. 7A and 7B are simplified schematic diagrams, from the image plane, showing diffraction of on-axis and off-axis sunlight, for 1D and 2D diffraction gratings, respectively.

Figure 7C:
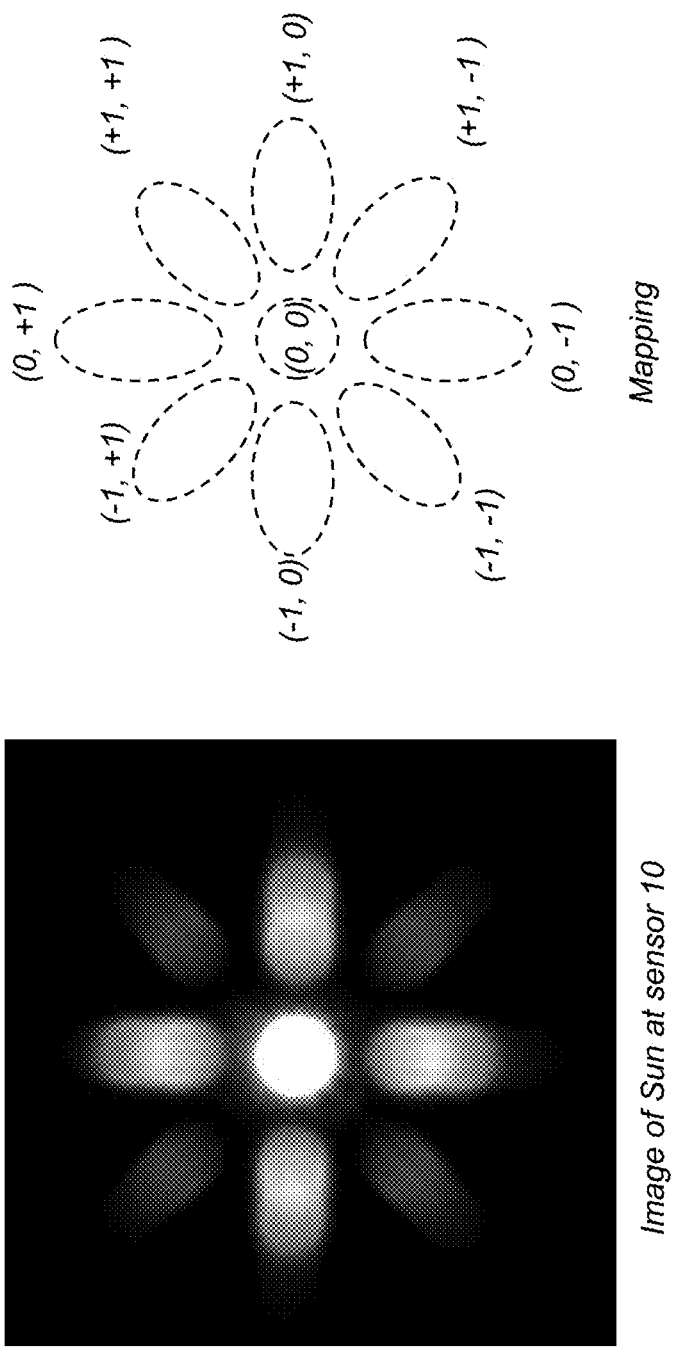

FIG. 7C is an image acquired from diffraction of sunlight through an aperture with a 2D diffraction grating.

Figure 8A:
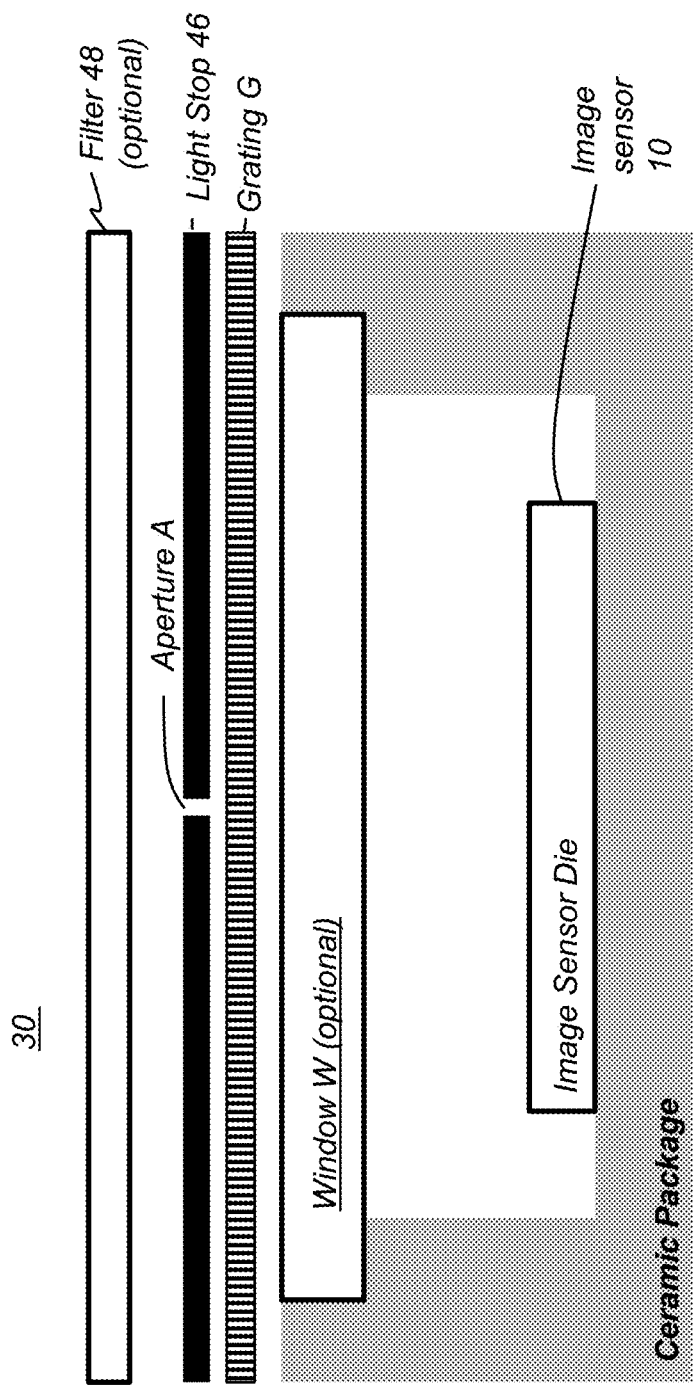

FIG. 8A is a schematic diagram that shows, from a side view, components of a lensless image sensor for laser detection.

Figure 8B:
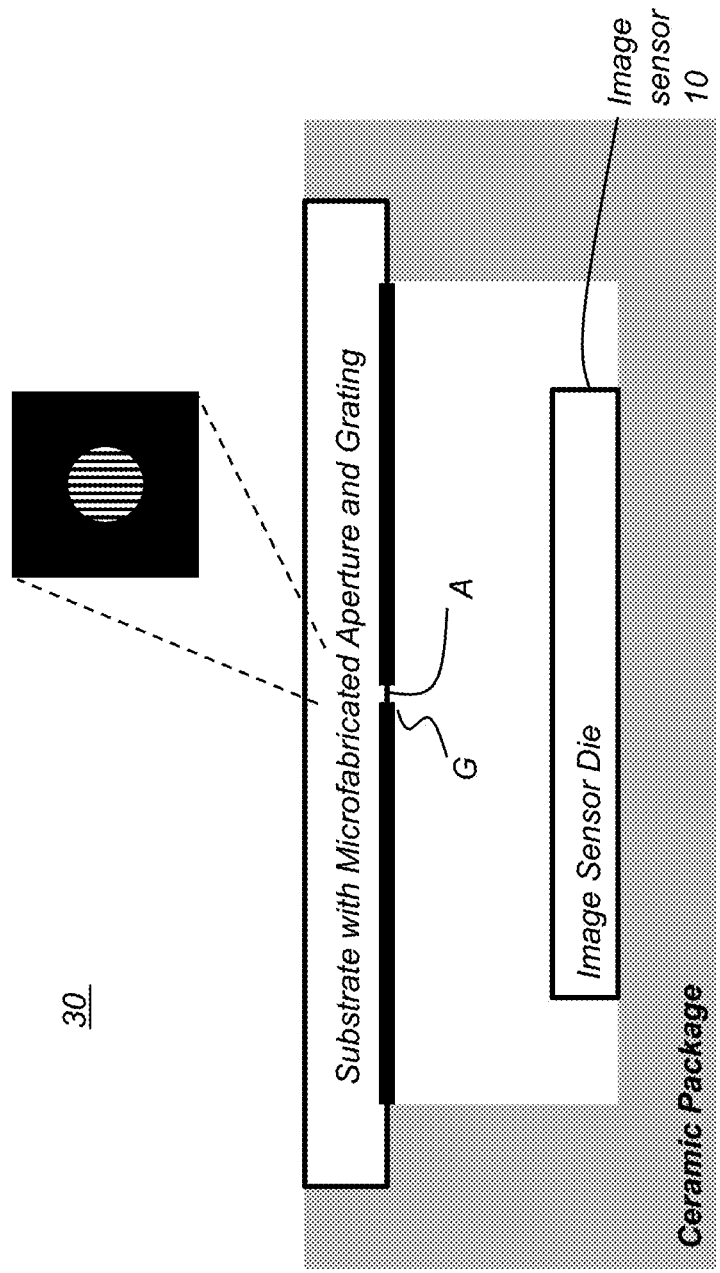

FIG. 8B is a schematic diagram that shows, from a side view, components of a micro-fabricated lensless image sensor for laser detection.

Figure 9:
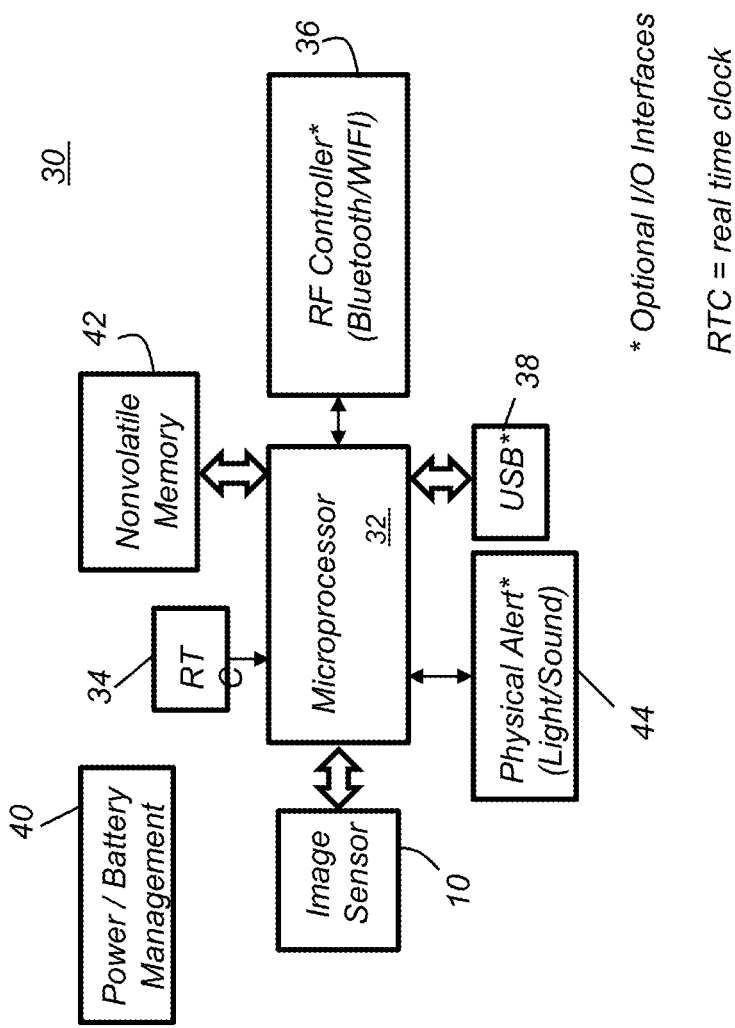

FIG. 9 is a schematic block diagram showing internal component structure for a lensless laser detection system.

FIG. 10A shows example specifications for an image sensor according to an embodiment.

Figure 10B:
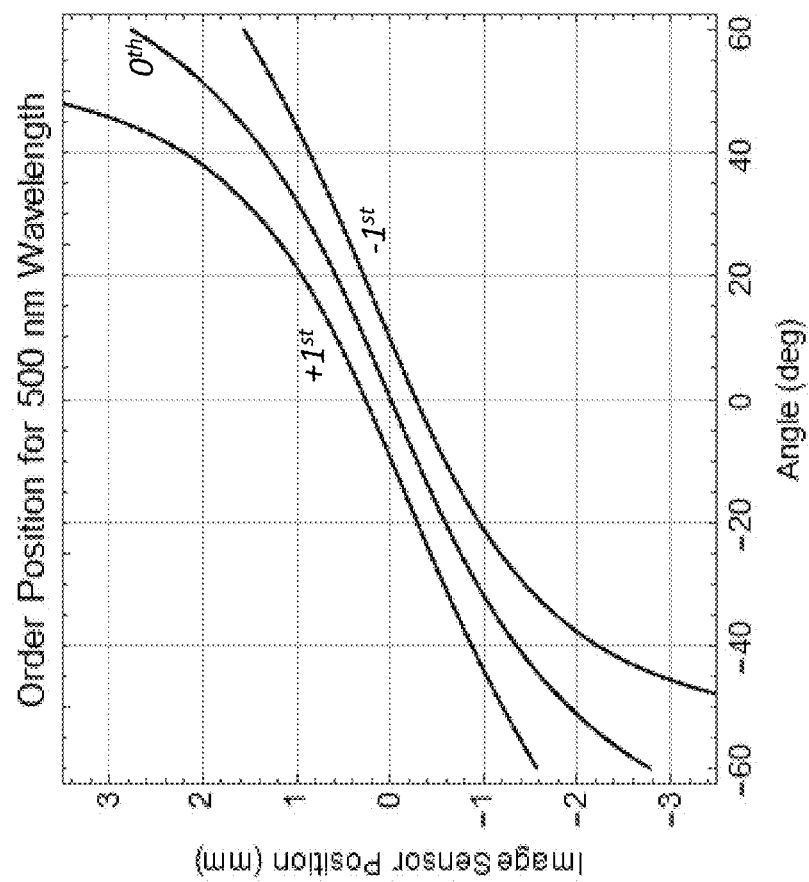

FIG. 10B is a graph showing position of order signals vs. angle for detection of a 500 nm light source.

Figure 10C:
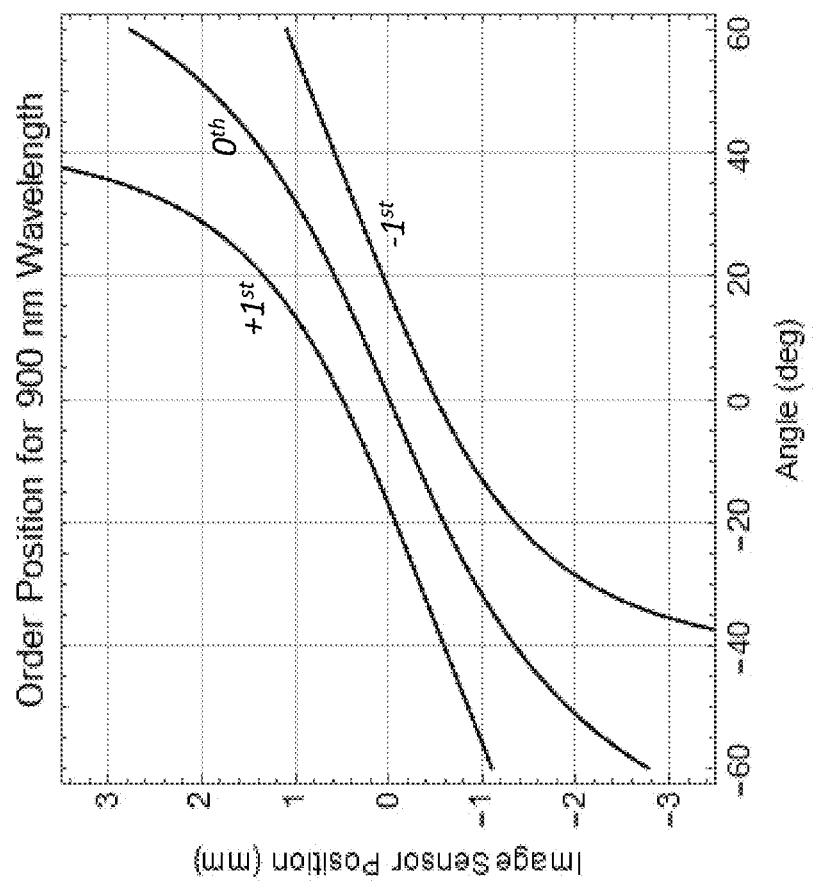

FIG. 10C is a graph showing position of order signals vs. angle for detection of a 900 nm light source.

Figure 11:
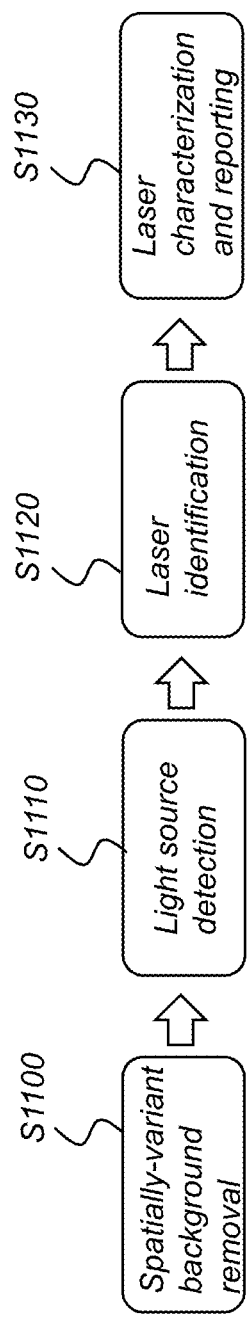

FIG. 11 is a block diagram showing a processing sequence for laser detection.

Figure 12:
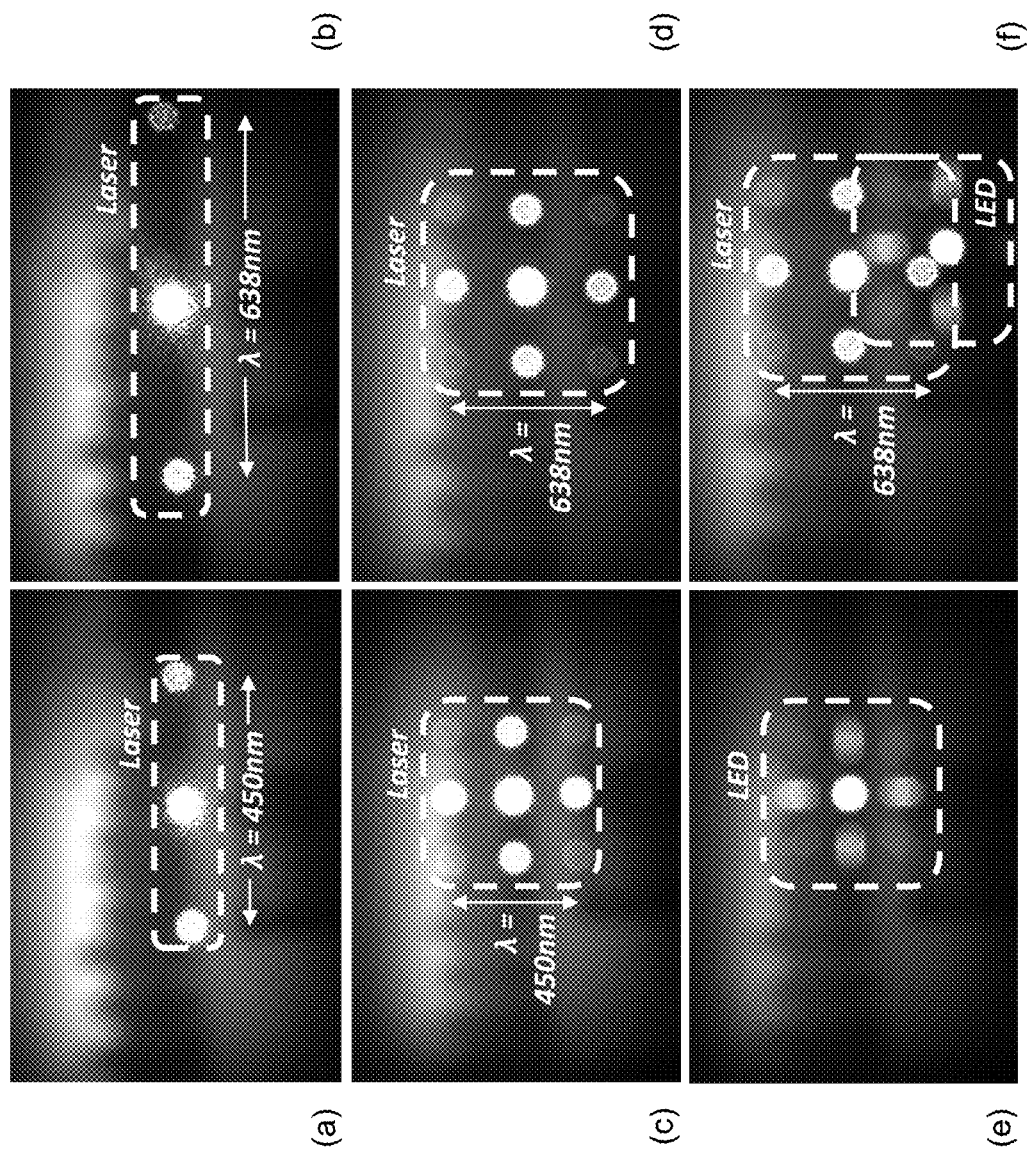

FIG. 12 shows examples of image sensor detection for various types of light sources.

Figure 13:
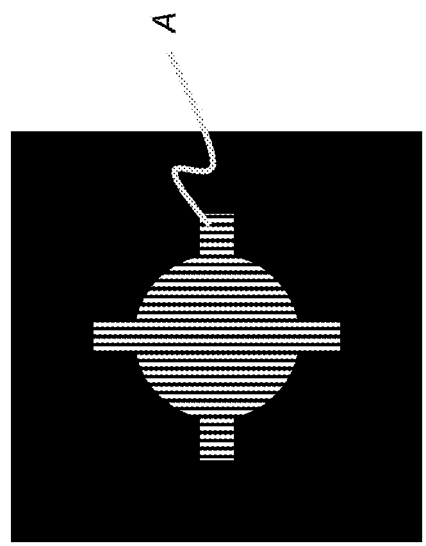

FIG. 13 shows an alternate pattern for an aperture.

Figure 14:
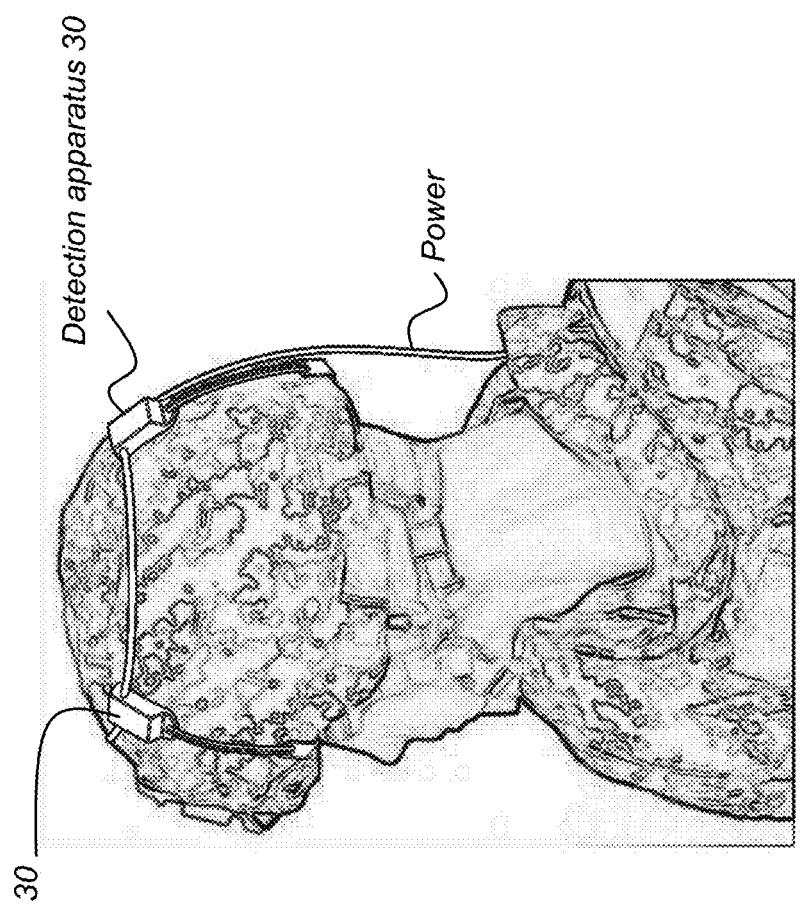

FIG. 14 is a perspective view showing a helmet-worn embodiment.

FIG. 15 shows perspective and top views of a configuration suitable for vehicular or stationary mounting, using multiple detection apparatus.

Figure 16:
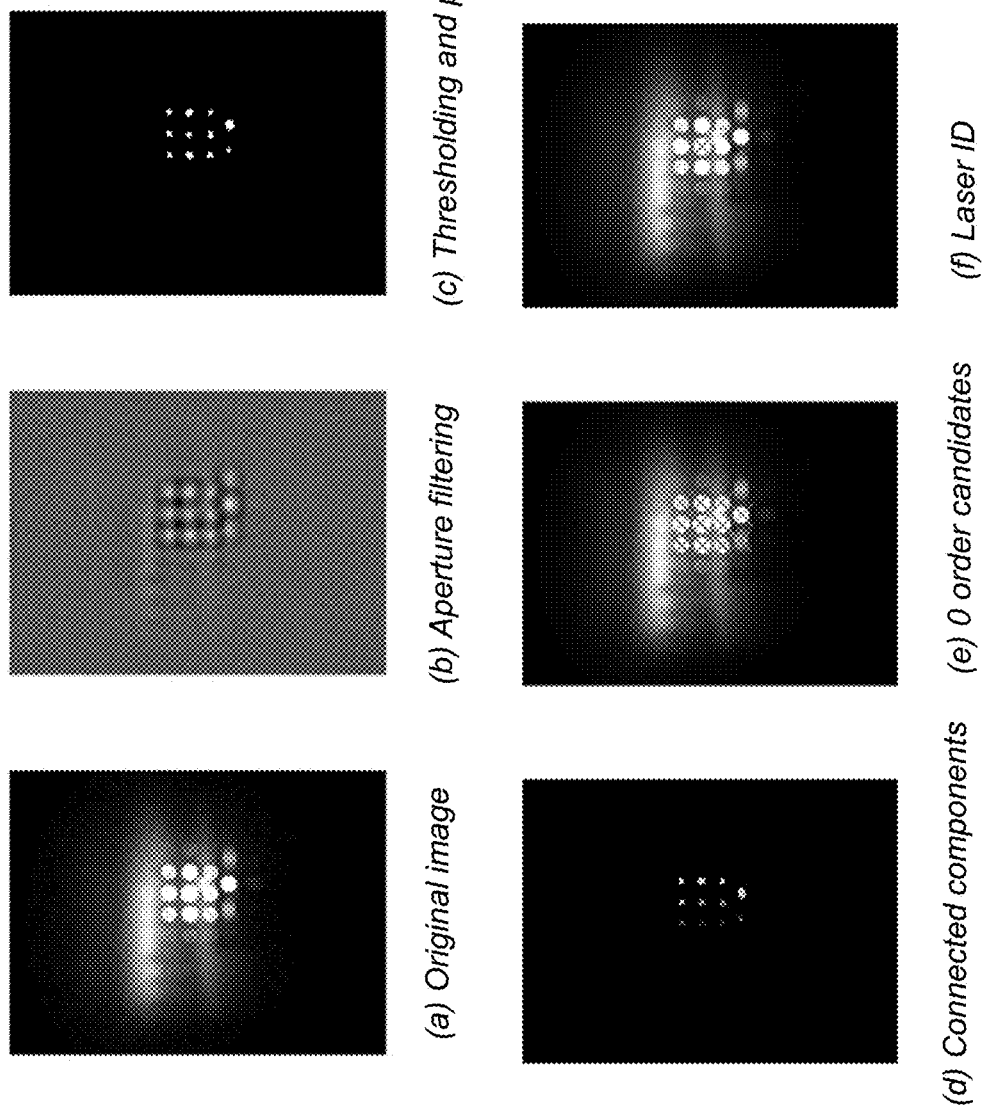

FIG. 16 shows steps in an exemplary algorithm for characterizing a light source.

DESCRIPTION

The following is a detailed description of the preferred embodiments of the disclosure, reference being made to the drawings in which the same reference numerals identify the same elements of structure in each of the several figures.

Where they are used, the terms "first", "second", and so on, do not necessarily denote any ordinal, sequential, or priority relation, but are simply used to more clearly distinguish one element or set of elements from another, unless specified otherwise.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the phrase "point light source", more succinctly termed "point source" refers to a source of light that can be modeled as an ideal point in object space having a single location and minimal spatial extent. Furthermore, a point source as used herein may emit light in all directions, as is the case for the sun, or may emit highly collimated light, as can be obtained from a laser, or may emit light in only a certain range of angles.

Embodiments of the present disclosure address the problem of laser detection and other characterization of light sources, obtaining information on angular position, wavelength, and other characteristics of the light, using methods that employ diffraction and lensless imaging. The Applicants' device acquires and processes image data using a simple optical system, using components having planar surfaces, to determine laser position, intensity, and wavelength over a wide field of view (FOV), such as 30 degrees, 50 degrees, or even greater than 120 degrees, for example.

In order to more fully appreciate the approach and scope of the Applicants' apparatus, it is useful to consider the simplified architecture of the Applicants' solution and the behavior of light transmitted through a small aperture with a diffraction grating.

In the context of the present disclosure and for the sake of consistency, the $0^{th}$ order light is counted as a diffraction order, rather than considered "non-diffracted" light. Thus, for example, the $0^{th}$ order and $+1^{st}$ order light count as two diffraction orders.

Figure 1A:
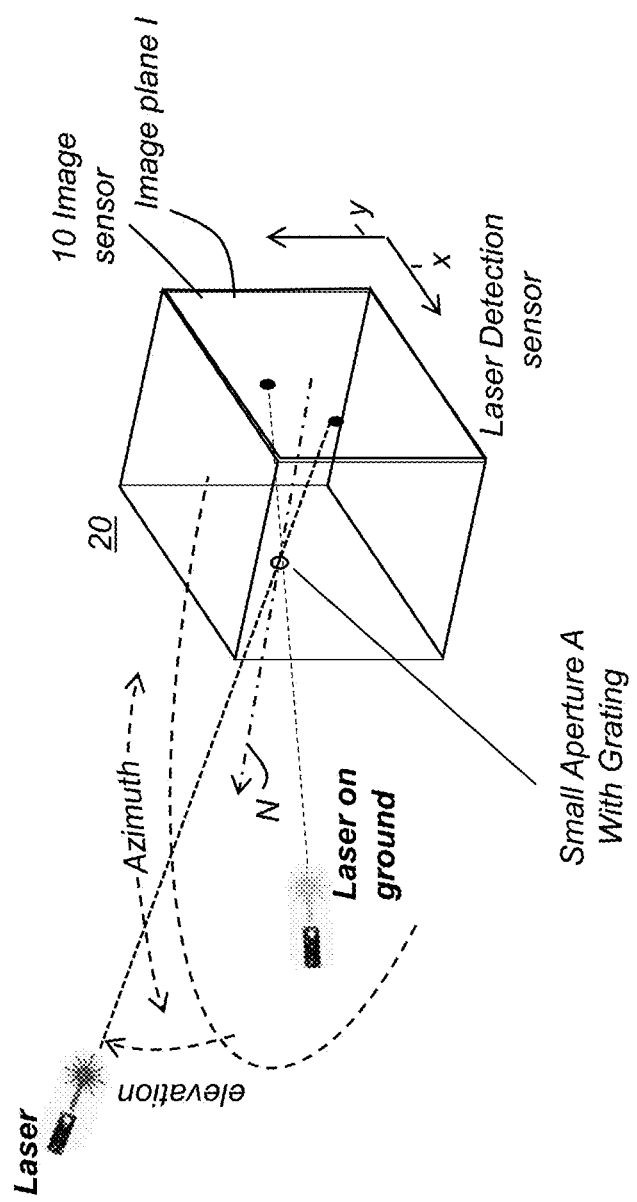
FIG. 1A is a schematic diagram that shows geometry of a lensless imaging device for laser detection.

FIG. 1A is a schematic diagram that shows, in simplified form, geometry of a lensless detection apparatus 20 for laser detection, for lasers pointed toward the device. Geometry of an aperture A and an image sensor 10, energizable to generate an image, define a field of view that includes, for each of one or more light sources, a corresponding light path that extends along a central ray beginning from the location of the light source, through the center of the aperture A, and to an image plane I. This geometry can be used to determine the direction of the light source relative to the imaging apparatus. The imaging apparatus has a diffraction grating, at or very near the aperture, for receiving incident light passed through a small aperture A. The light-transmitting area of aperture A, cross-sectional with respect to the light path, is smaller, and typically much smaller, than the imaging area of image sensor 10. The zero-order light transmits through the grating and is received at an image sensor 10 on image plane I, spaced apart from the aperture A. The zeroth diffraction order light on image plane I is a geometrical projection of aperture A along the central ray from the light source. The intensity distribution of the zeroth diffraction order light on image plane I is determined by factors such as type of light source and distance.

The incidence position of the transmitted laser light has particular x-y coordinates; these coordinates indicate the elevational and azimuthal angles of the laser light source relative to image plane I of the lensless detection apparatus 20. Reference axis N is normal to image plane I and passes through the center of the small aperture A.

The distance from aperture A to image sensor array 10 can be less than twice the diagonal of the image sensor array.

Figure 1B:
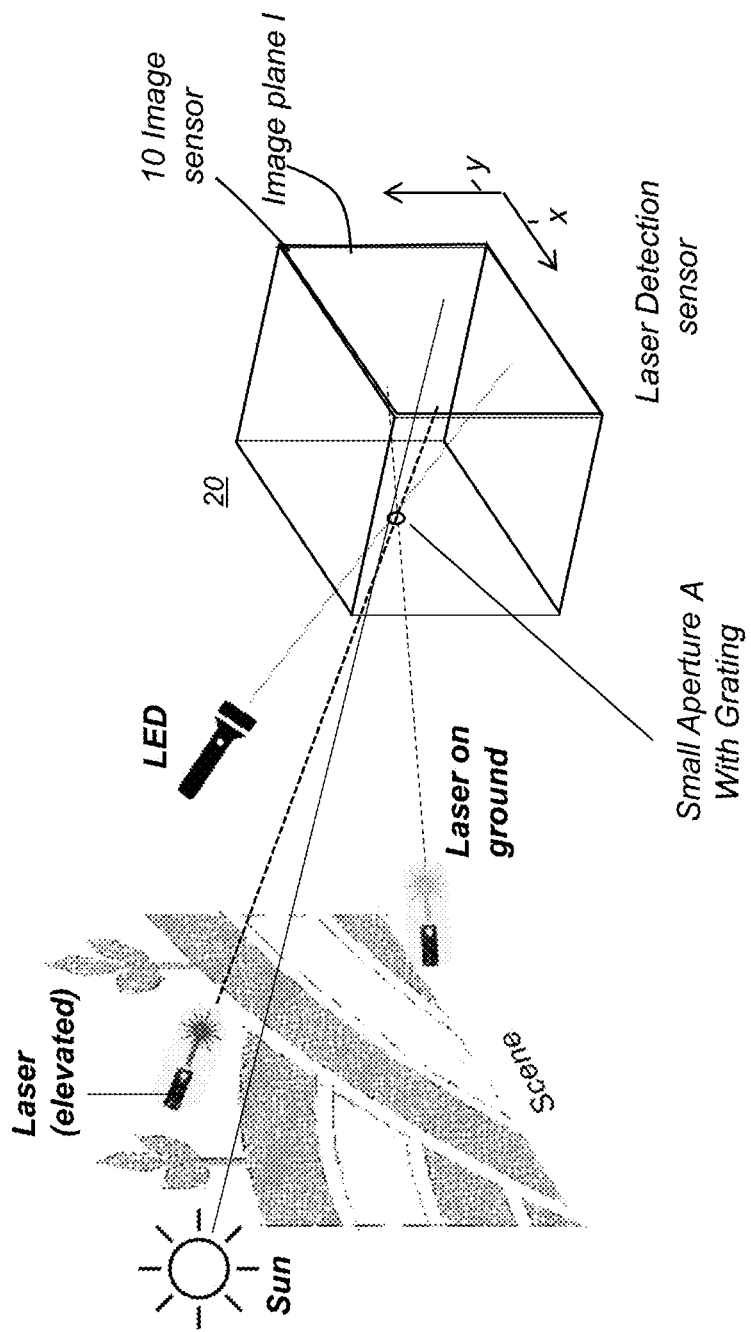
FIG. 1B is a schematic diagram that shows the imaging device of FIG. 1A in an environment having multiple light sources of different types, along with scene content.

FIG. 1B is a schematic diagram that shows detection apparatus 20 of FIG. 1A in an environment having multiple light sources of different types and located at different angles, directed toward, or in the FOV of, the device, along with scene content. Light sources at different azimuth and elevation relative to the apparatus have corresponding x-y coordinates in image plane I. The presence of other, non-laser light sources, particularly sources of bright light, complicates the task of identifying and characterizing laser light sources. However, using the geometry described, detection apparatus 20 can generate a distinct spatial/spectral signature image providing ability to discriminate various types of light from laser sources. Spatial characteristics of interest for the generated light pattern that is received by detection apparatus 20 can include shape, position, concentric rings, and average pixel value of a pattern feature, for example. Thus, laser sources, which have very narrow spectral content and are treated, in practice, as essentially monochromatic, with the bulk of the emitted light energy at a single wavelength, can be distinguished from other broadband sources including the polychromatic Sun, LED, incandescent, halogen, or other sources that have broader spectral content than lasers. Laser sources having multiple wavelengths can also be distinguished using detection apparatus 20.

Figure 1C:
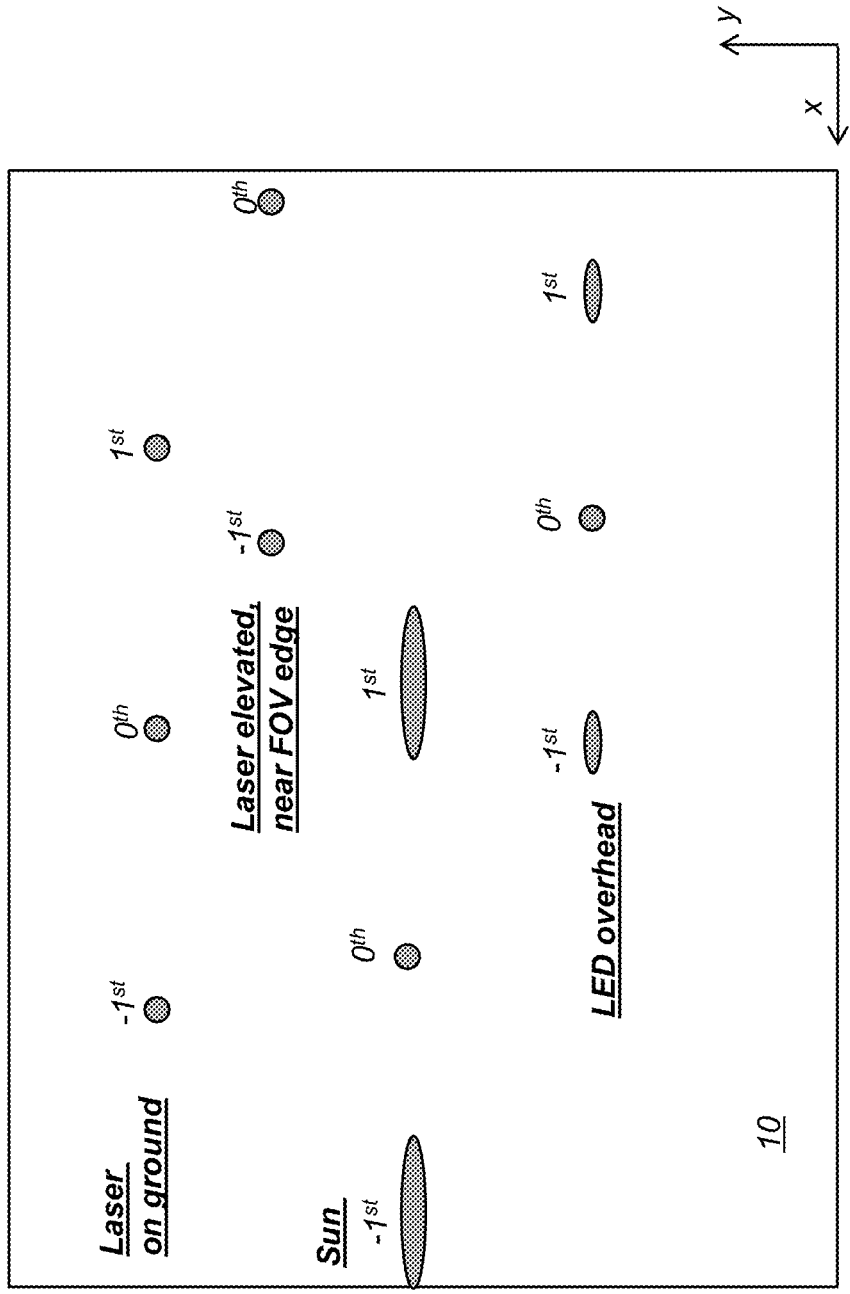
FIG. 1C is a simplified diagram showing aspects of various types of light incident on the image plane of the imaging device of FIG. 1A.

FIG. 1C shows an exemplary distribution of light at the image sensor 10 for the simplified detection apparatus 20 where there are multiple light sources shown in FIG. 1B. As described with reference to FIG. 1B, the x-y dimensions of the $0^{th}$ order and +/−1 order diffracted light relate directly to the elevation and azimuth angle of the light source. (It can be noted that the x-direction of the light sources is inverted relative to FIG. 1B.) Spectral distribution is characteristic of each type of light source, generally as follows:

(i) Light from the Sun is diffracted near aperture A to provide $0^{th}$ diffraction order light and, at least, the diffraction orders −1 and +1. The $0^{th}$ order light is spatially concentrated. Because the sunlight is highly polychromatic, diffraction orders −1 and +1 exhibit significant spectral dispersion, forming a "smeared" or highly elongated image of the aperture A, which can be described as "spectral smearing".

(ii) The $0^{th}$ diffraction order LED light at the image plane in FIG. 1C is also concentrated and forms a clear image of the aperture. The LED light energy is over a narrower wavelength band than is sunlight, so that −1 and +1 diffraction orders exhibit relatively moderate spectral dispersion.

(iii) For laser light, with its narrow wavelength band, −1 and +1 diffraction orders do not exhibit spectral dispersion and are spatially concentrated, resembling the $0^{th}$ order image in terms of light distribution at the image plane.

Various spectral characteristics of a light source can be detected including wavelength range, one or more peak wavelengths, and other spectral features allowing differentiation of many types of light sources.

In embodiments described herein, the location of the laser is determined by the corresponding position of the central $0^{th}$ diffraction order on the imaging array, formed as a geometric projection of aperture A onto the image plane along the central ray direction. The path of the central ray from the light source may be altered by the presence of windows, mirrors and other optical components, even components with some curvature. The geometric projection of aperture A can have significant blurring or lack of definition along the outer edges, but takes its shape and overall outline from the aperture shape, as the term implies. The light distribution within the $0^{th}$ diffraction order may also contain intensity oscillations caused by diffraction. The distance between the $0^{th}$ order light and the resulting images of aperture A from the +/−$1^{st}$ orders corresponds to the laser's wavelength. Specifically, the angular separation between diffraction orders is given by the grating equation and depends on factors including wavelength, the pitch of the grating, and the incident angle with respect to the normal axis.

Figure 2A:
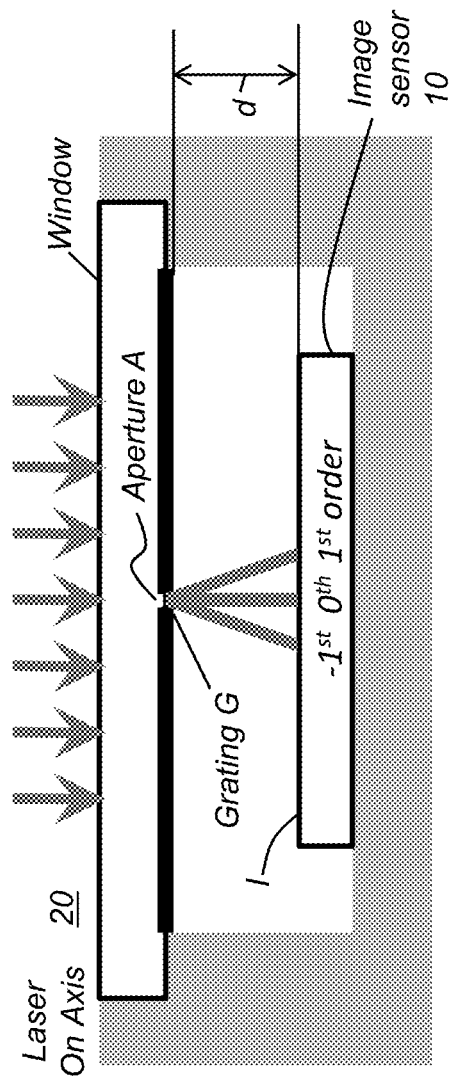
FIGS. 2A and 2B are simplified schematic diagrams, from a side view, showing diffraction of on-axis and off-axis laser light, respectively.
Figure 2B:
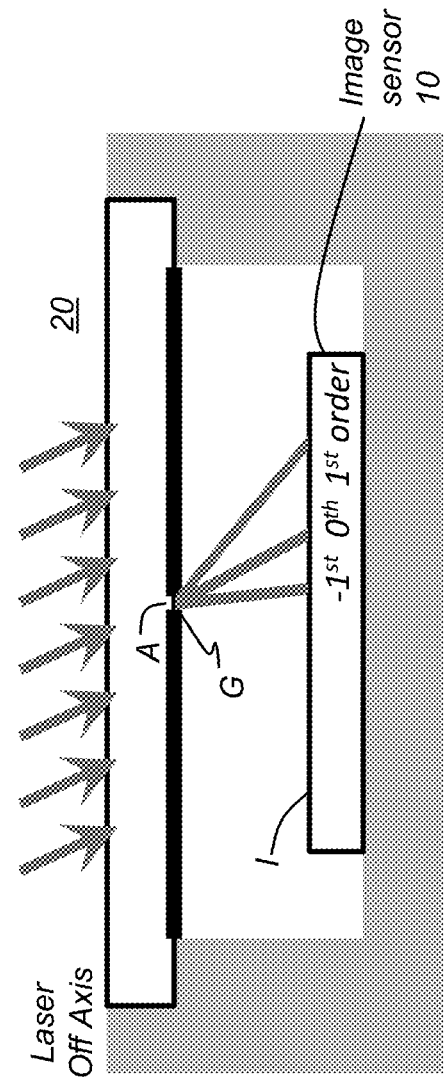

FIGS. 2A and 2B are simplified schematic diagrams, from a side view, showing effects of diffraction at the aperture A for on-axis and off-axis laser light, respectively, for a simplified detection apparatus 20, which can be provided as a single packaged unit. Components of detection apparatus 20 can include a protective window, an aperture A against the optional window, a diffraction grating G at or very near aperture A, and an image sensor 10 at image plane I. Only planar optics are used; no lenses are needed.

In the embodiment of FIGS. 2A through 4, the diffraction grating G is disposed very near or formed within or along the aperture A. Distance d shown in FIGS. 2A through 4 relates to the relative displacement of image sensor 10 from aperture A and diffraction grating G. In practice, reducing distance d increases the FOV of detection apparatus 20 but decreases the spatial separation of diffraction orders on image sensor 10. The aperture A and diffraction grating G can be formed on the same substrate.

Referring to FIG. 2A, where the laser light source is on-axis, with incident angle at a normal to the incident surface of sensor 10, the respective −1 diffraction order and the +1 order light distributions are equally spaced from the image of the aperture A generated by the $0^{th}$ order light. As the laser light source moves further off-axis, as in FIG. 2B, locations of diffraction orders and spatial distances between $0^{th}$ and +/−$1^{st}$ orders change correspondingly.

Figure 3A:
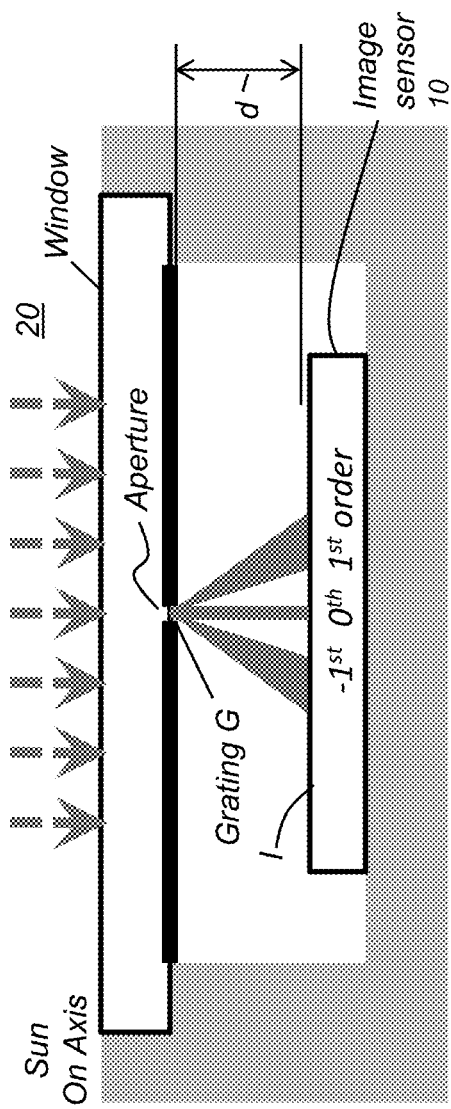
FIGS. 3A and 3B are simplified schematic diagrams showing diffraction of on-axis and off-axis sunlight, respectively.
Figure 3B:
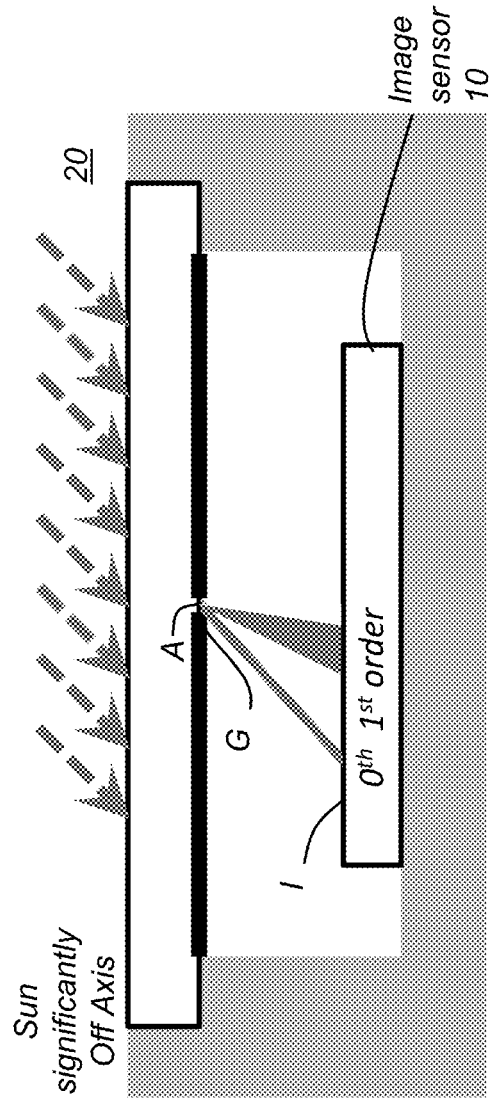

In similar manner, FIGS. 3A and 3B are simplified schematic diagrams showing diffraction of on-axis and off-axis sunlight, respectively. Where the sunlight is on axis, as in FIG. 3A, the respective −1 order and the +1 order light distributions are equally spaced from the $0^{th}$ order light. As the angle of the sun moves away from normal, the diffraction orders shift position accordingly. In the example of FIG. 3B, the −$1^{st}$ order is shifted so far to the left to be no longer detected by image sensor 10. Shorter wavelengths are diffracted by a smaller amount than longer wavelengths. Therefore, the corresponding short-wavelength portions of −1 and +1 orders are closer to the $0^{th}$ order than the corresponding long-wavelength orders.

Figure 4:
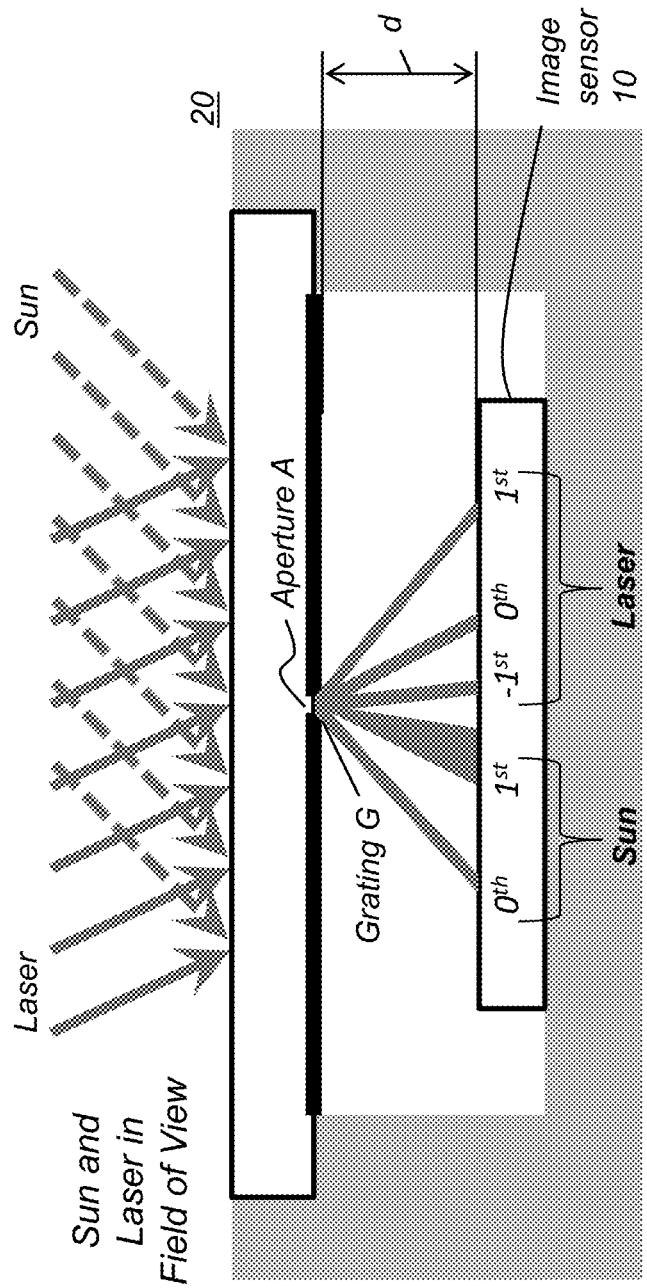
FIG. 4 is a simplified schematic diagram that shows diffraction effects wherein both a laser source and the Sun are within the field of view.

FIG. 4 is a simplified schematic diagram of detection apparatus 20 that shows diffraction effects wherein both a laser source and the sun are within the field of view and each of the light inputs is at an off-axis angle. As multiple light sources can be expected in many environments where laser detection is needed, the particular diffractive signature of the light received on image sensor 10 at the image plane I can be used to distinguish light sources and to identify their relative wavelengths and positions.

In order to more accurately characterize light sources and to distinguish or isolate the laser light source for further analysis, embodiments of the present disclosure can use diffraction gratings of various types. One familiar type of diffraction grating is a 1D amplitude grating G1, represented in FIG. 5. The light-blocking grating features for 1D amplitude grating G1 are linear and parallel, extending along one direction. Inter-line spacing can be optimized to cover a particular range of wavelengths, including well-defined laser wavelengths of interest. The diffraction efficiency of a 1D amplitude grating G1 is relatively insensitive to wavelength, making it useful over a range of wavelengths and thus generating a distinctive diffraction "signature" for numerous laser types. For example, an ideal 1D amplitude diffraction grating similar to the type shown in FIG. 5 could have a diffraction efficiency of 10.1% into each of the +1 and −1 diffraction orders and 25% into the zero order, independent of wavelength. A phase grating could alternately be used for laser detection; however, phase gratings are generally much more sensitive to wavelength. Thus, a phase grating may be more useful in an application where laser light within a specific wavelength range must be detected.

For enhanced detection capability, a 2D diffraction grating can be used. FIG. 5 compares structure of a portion of a 1D diffraction grating G1 with a portion of a 2D diffraction grating G2. The 2D grating G2 structure in FIG. 5 has two sets of diffraction features, aligned orthogonally to each other. For example, an ideal 2D amplitude diffraction grating G2 similar to the type in FIG. 5 could have a diffraction efficiency of 2.53% into each of the four primary first diffraction orders, (+1,0), (−1,0), (0,+1) and (0,−1), and 6.25% into the zero order, independent of wavelength. Although low efficiency is a concern for many types of systems, it can be an advantage when attempting to detect very bright sources such as lasers where image sensors can be saturated or even destroyed. Other types of 2D diffraction structures may also be employed, for example a grating with unit cells on a hexagonal grid.

FIGS. 6A through 7B provide comparison of 1D and 2D grating results of light pattern distribution on the image sensor, in simplified schematic form. Orders corresponding to the 1D grating G1 are single digits; orders corresponding to the 2D grating G2 include two coordinate digits. As shown at the left in FIGS. 6A and 6B, for on- and off-axis laser sources, respectively, the conventional 1D grating G1 generates diffraction orders disposed along a single line. For comparison, light pattern results for the 2D grating G2 consist of a 2-dimensional distribution of diffraction orders as shown at the right in FIGS. 6A and 6B. The grid of diffraction orders for 2D gratings in FIGS. 6A and 6B is representative and may be more complex in practice, for example with hexagonal gratings and/or large off-axis angles. Higher orders of diffraction, such as +2 and −2 diffraction orders, may be present as well but are not shown in FIGS. 6A and 6B.

The schematic diagrams of FIGS. 7A and 7B show the diffraction signature of on- and off-axis sunlight, respectively. FIG. 7C shows an example of sensed light for sunlight on or near the device axis for a 2D grating G2 (FIG. 5). A mapping showing corresponding diffracted orders is given at the right in FIG. 7C. The elongation of the non-zero diffraction orders is a result of spectral dispersion, as noted previously. In the FIG. 7C example, the four cross diffraction orders, (+1, +1), (+1, −1), (−1, +1) and (−1,−1), are noticeably less bright than the four primary non-zero diffraction orders, (+1, 0), (0, +1), (−1, 0) and (0, −1); the zeroth order (0,0) is brightest.

Using the method described with reference to FIGS. 2A-7C, the source of a laser can be accurately determined according to the position of the central $0^{th}$ diffraction order on the image sensor. The distance of the $0^{th}$ order light to the +/−1st diffraction orders, combined with position, can indicate the laser's wavelength. Furthermore, the optical power density of light from the laser can be estimated from the brightness of the $0^{th}$ order, as measured by the image sensor and adjusted for system parameters such as exposure time, measured wavelength and (transmission) efficiency into the $0^{th}$ order.

The Applicants have adapted principles of light diffraction, in one or two dimensions, to provide a lensless laser detection system that allows compact packaging and imaging, at relatively low cost. This allows the apparatus of the present disclosure to be scaled to appropriate size for personnel or equipment that require laser detection.

The side view schematic of FIG. 8A shows, in exploded view form, an arrangement of components of a lensless laser detection apparatus 30. Image sensor 10 can be enclosed in a ceramic package. Alternately, the complete image sensing unit can be formed as a chip-scale device, which has inherent advantages for spacing and alignment, for example. A planar window W can provide protection from dirt, smoke, or contaminants. A light-stop 46 provides aperture A for incident light. A diffraction grating G can be sandwiched closely between the light stop and the window. An optional filter 48 can help to block certain wavelengths from the detection path or can be used to prevent saturation of image sensor 10 in the presence of intense laser energy. For example, filter 48 can be a neutral density (ND) filter. The aperture can be formed to be contiguous with the diffraction grating, such as using a layer of chrome or other suitable material for providing diffraction features as well as defining the aperture.

FIG. 8B is a schematic diagram that shows, from a side view, components of a micro-fabricated lensless laser detection apparatus 30. Microfabrication, using techniques such as semiconductor or MEMS (MicroElectroMechanical Systems) fabrication processes and equipment, can be used to integrate some components, such as the aperture, diffraction grating, and protective window, for example. Using microfabrication methods allows fabrication of a low-cost lensless laser detection apparatus 30, inherently sealed and capable of being deployed as a wearable or built-in unit. Although FIG. 8B shows a microfabricated substrate with aperture A and grating G on the bottom side of the substrate, other embodiments can have the aperture and grating on the opposite side.

A microfabricated substrate could consist of a thin metal layer, such as chrome or aluminum, deposited on a glass or quartz substrate. The metal layer would be lithographically patterned to form an aperture with grating features inside. Outside of the aperture region, the metal layer would be sufficiently opaque to block bright laser light from reaching image sensor 10.

FIG. 9 is a schematic block diagram showing internal component structure for an exemplary lensless laser detection apparatus 30, according to an embodiment. A control logic processor 32, supported by a real-time clock 34, provides logic and control signals for apparatus 30 components and can generate output signals indicative of light source type, angular position, and other characteristics that can be determined from analysis of the detected light pattern. Control logic processor 32 can use stored program instructions to perform its various functions for analyzing the diffraction patterns formed on the image sensor, including comparing shape, position, and intensity distributions of different orders of light. A memory 42 stores image data and other data for processing and transmission. A power source 40 can be a storage battery or other device, including a rechargeable battery. Signal communications can be provided using a communications interface 38 such as a USB port to some other processor, or using a wireless transmitter 36, such as a Bluetooth or other WiFi communications device. One or more alert devices 44 can be provided, such as to provide a visible, audible, or tactile indication related to laser detection.

Control logic processor 32 can be programmed to generate signals indicative of detected features of the light sources, including at least the wavelength or wavelength range and angular direction, for example, along with other characteristics, such as type of light source, whether laser or non-laser such as LED, sunlight, or incandescent light, and relative intensity, for example.

FIG. 10A shows an example of specifications for a lensless laser detection apparatus 30 according to an embodiment of the present disclosure. It can be noted that a sizable FOV can be obtained using the device structure shown in FIGS. 8A and 8B. Values given are (width×height) or Horizontal (H)×Vertical (V), based on standard orientation for the detection apparatus 30.

Image sensor 10 can be any of a number of suitable imaging arrays. For example, CMOS image sensors such as the Sony IMX178 CMOS sensor with back-illuminated pixels can be used for wavelengths between 400 and 1000 nm. Back illumination is advantageous for achieving wide field of view for the lensless laser detector because it minimizes obscuration by wires on the sensor die; unintended effects such as a reduction in effective field of view can be the result of obstructed light paths and light at high angles.

Some exemplary devices based on the SONY IMX178 camera can include the UI-3881LE-M-GL camera board from Image Development System (IDS), Obersulm, Germany, advantaged for its lower power consumption, and DMM 37UX178-ML monochrome board image sensor from The Imaging Source (Charlotte, NC).

FIGS. 10B and 10C show plots of the calculated position of diffraction orders on an image sensor of a laser detection system 10 that has the same specifications as in FIG. 10A. FIGS. 10B and 10C relate to laser wavelengths of 500 nm and 900 nm, respectively. The incident angle for these figures varies in a plane perpendicular to the grating lines. As expected, the $0^{th}$ order position is independent of wavelength but varies monotonically with angle, enabling the determination of the angular direction of incident light. The position of the two first diffraction orders is calculated using the grating equation. These plots illustrate the fundamental physical principles used to determine laser position and wavelength. Practical automated implementation in a laser detection system 10 requires a robust image analysis algorithm.

To detect lasers at longer wavelengths where conventional silicon-based image sensors are not sufficiently sensitive, other image sensor technologies can be employed, as is known to those skilled in the art. For example, laser wavelengths in the shortwave infrared (SWIR) range between 900 and 1700 nm (or even longer) can be detected using InGaAs based image sensors as image sensor 10.

Alternatively, for lower cost and lighter weight SWIR detection of laser light in the wavelength range 900-1600 nm, the image sensor can use a standard imaging array designed for visible light and modified with suitable up-conversion phosphors, using techniques familiar to those skilled in the IR imaging arts. For example, the up-conversion material can be coated directly onto a portion of a visible image sensor, such as the Sony IMX178, or could be coated onto another substrate in very close proximity to the image sensor. With the effective use of up-conversion techniques, a lower-cost imaging array can be adapted to detect a broader range of laser wavelengths in visible and IR ranges.

FIG. 11 is a block diagram showing a processing sequence for laser detection from acquired images from apparatus 30, according to an embodiment. Due to the wide FOV of the device, which can be 30 degrees or higher, and the resulting highly varied scene content, it can be useful to perform a spatially variant background removal in a background removal step S1100. Background removal can help to eliminate clutter in preparation for feature detection, removing substantial amounts of scene content while retaining details from incident light. The removal step can take into account both the spatial frequency and relative intensity of the background. A detection step S1110 detects light sources from the processed image data that remains. Detection step S1110 can use point source detection, applying low-complexity techniques including edge detection and matched filtering to identify potential point sources throughout the scene. For example, a parameterized matched filter that adapts to the expected shape of a point source in each orthogonal direction may be used. Relative intensity of adjacent, orthogonal point sources can be compared to determine the location of the non-diffracted, zero order corresponding to each point source.

Continuing with the FIG. 11 process, an identification step S1120 identifies one or more laser sources within the image content. Laser classification algorithms can assess spatial features such as the relative edge response of the diffraction orders to determine if the point source is a laser. High-frequency image content from Fresnel diffraction can be detected utilizing an FFT (Fast Fourier Transform), which can provide additional confidence in laser source detection. A response step S1130 determines laser type, wavelength, intensity, and relative position and provides some type of indication to the wearer or other concerned individuals and, in some applications, to others who are in signal communication with detection apparatus 30 or with individuals or objects associated with apparatus 30. In most applications, the user of detection apparatus 30 is alerted instantly upon detection of a laser signal and can be provided with information on protective or evasive measures, such as wearing protective eyewear for example. Alternatively, laser detection can trigger an automated protective measure such as deployment of a light shield over a sensitive piece of equipment.

FIG. 12 shows examples of image sensor detection for various types of light sources against a real-world landscape scene. At (a) in FIG. 12, imaging results are shown for detection of a 450 nm laser using a device having a 1D grating configuration. As with schematic examples given in FIGS. 6A-7B, the zeroth order light is at the center of the distributed pattern, with −1 and +1 orders to either side for 1D grating examples. At (b) in FIG. 12, results are shown for detection of a 638 nm laser using a device having a 1D grating configuration. At (c) in FIG. 12, results are shown for detection of a 450 nm laser using a device having a 2D grating configuration. Again, the zeroth order light energy is at the center of the pattern. At (d) in FIG. 12, results are shown for detection of a 638 nm laser using a device having a 2D grating configuration.

It can be observed from comparison of FIG. 12 images (a) and (b), and similarly by comparing (c) and (d), that spacing between orders in the light distribution varies according to laser wavelength, with larger spacing corresponding to longer wavelength. It can also be observed that background content for the actual image scene can be readily detected and suppressed and that light distribution patterns can be enhanced for improved accuracy in source and wavelength detection.

FIG. 12 part (e) shows the light pattern obtained from a polychromatic white LED. The first order light is considerably smeared in appearance, as compared against the laser light. FIG. 12 part (f) shows the image content when both a 638 nm laser and a polychromatic white LED are in the field of view.

From the 2-D grating images of FIG. 12 parts (c) through (f) it can be appreciated that the 2-D grating can provide more accurate detection than the 1-D grating and can help to reduce or eliminate "false positive" readings.

The Applicants have found that the laser signature is unique and clearly distinguishable from sunlight and from LED emission. For example, the laser power density for figures shown herein is on the order of magnitude of 100 $uW/cm^2$. Laser orders appear in sharp contrast, and Fresnel diffraction effects (concentric rings) are clearly visible in diffraction orders of laser sources. By comparison, sunlight and LED source image content can be readily distinguished from laser image content by their relatively smeared diffraction orders due to their relatively broad wavelength spectrum compared with the laser. Even relatively narrow-band LED sources can be distinguished from lasers by both relative intensity of the orders and appearance of the diffraction orders.

Use of the basic principles and structures described with reference to FIGS. 1A through 10C allow a micro-fabricated device to be capable of identifying the source position, wavelength, and relative intensity of a laser and to distinguish laser light from other natural and man-made sources. The flexibility and robustness of the Applicants' approach allows a number of embodiments. For example, the detection apparatus can have multiple apertures with corresponding gratings optimized for different wavelength ranges. The apertures may have different dimensions and the gratings may have different grating periods. Aperture shape can be modified in order to support more accurate identification, such as using the alternative aperture A shape shown in FIG. 13.

Wearable Laser Detection Apparatus

Embodiments of the present disclosure can be wearable, allowing their use in military and commercial applications. By way of example, FIG. 14 shows a helmet-mounted embodiment, with two or more detection apparatus 30 arranged to detect incident laser light from different angles. Various types of fixturing methods can be used to provide and maintain proper spacing for the needed coverage range, such as 360 degrees or, with a sufficient number and arrangement of detection apparatus 30, 2π steradian.

FIG. 15 shows perspective and top views of a configuration suitable for vehicular or stationary mounting, using multiple detection apparatus 30. The arrangement shown in FIG. 15, using four apparatus 30, each having an FOV of 120 degrees, is capable of providing detection over a total field of more than 2π steradian.

Laser Detection Logic

FIG. 16 shows an example sequence that illustrates one embodiment of a laser detection algorithm. The initial laser detection can leverage a convolution kernel designed to detect the image of the aperture on image sensor 10. Image (a) in FIG. 16 shows source image data obtained from the sensor. Image (b) in FIG. 16 shows the result of convolution with a kernel designed for detecting the aperture image. The kernel shape can be a circle, assuming a circular aperture, and the shape can be invariant when applied over the entire image plane. Alternatively, the shape can be circular near x=0 and y=0 of the image plane and elliptical near the edges, in some embodiments, matching the image of the aperture. The kernel elements can be parameterized to vary, based on position in the image plane, to match the expected shape of the aperture projected onto the center of the current pixel. The filter can be positive within the circle or ellipse, and negative outside the circle or ellipse, such that the sum of all filter elements is zero. The matched filter can be applied to the source image. The resultant image can be thresholded to produce a binary detection image, which includes binary maps of all zero orders, as well as +/−1st orders, and, potentially laser and non-laser sources which must be identified.

Image (c) in FIG. 16 shows that basic morphological processing, such as an erosion then dilation, can be used to eliminate candidates or prune artifacts to reduce the number of false alarms. Then, a connected-component algorithm, as shown at image (d) in FIG. 16, can be applied to identify connected segments in the detection image. Possible zero-order candidates are marked by an "X" in FIG. 16 image (e). The centroid of each segment is calculated, and passed to a discrimination algorithm.

The discrimination algorithm can look at each segment to determine if it is a zero-order laser location. The expected size and shape of the area can be used to quickly screen candidates, which must have appropriate width and height expected for the pixel position. Then, the expected distance to +/−1 diffraction orders can be searched; if at least one +/−1 order exists, then this candidate is identified as a zero order. The presence of more than one +/−1 orders can add further confidence in zero order identification. The shape of the +/−1 orders can be evaluated, potentially by the ratio of length to width in the detect image, and also by the relative edge response, in order to determine whether or not the zero-order candidate is a laser. All of the obtained metrics can be combined to generate a single confidence metric that can indicate likelihood that a candidate is a laser source.

In FIG. 16 image (f), a laser zero order location is identified, marked by an "X". The distance between the centroids of the zero order and first order can be measured, and used to calculate the wavelength of the laser. The coordinates of the centroid of the zero order can be used to determine the source direction of the laser beam. This source direction relates directly to the geometric relationships of apparatus 30 components.

The algorithm described previously is one example embodiment. Adaptations for robustness and computational requirements may be necessary. For example, detection algorithm complexity can vary depending on the expected SNR of the laser energy for specific applications.

If laser illumination intensity is low relative to a bright sky background, a more complex detection algorithm, such as a Harris circle detector, may be required. The invention has been described in detail with particular reference to a presently preferred embodiment, but it will be understood that variations and modifications can be effected within the spirit and scope of the disclosure. The presently disclosed embodiments are therefore considered in all respects to be illustrative and not restrictive. The scope of the invention is indicated by any appended claims, and all changes that come within the meaning and range of equivalents thereof are intended to be embraced therein.

The invention claimed is:

1. An apparatus for characterization of one or more light sources over a field of view, comprising:
   (a) an image sensor array that defines an image plane having an imaging area with pixels, each pixel having a pixel area;
   (b) an aperture spaced apart from the image plane by an image distance that comprises an air gap that is bounded by the image sensor and disposed to define the field of view that defines, for each of the one or more light sources, a corresponding incident light path that lies along a central ray beginning at the corresponding light source, extending through a center of the aperture at an incident angle, and terminating at the image plane, and wherein the aperture has a light-transmitting area smaller than the imaging area and wherein the light path to the image plane is not focused;
   (c) a diffraction grating disposed in each of the incident light paths and configured to form, on the image sensor array, for each corresponding light source, a light pattern having at least a zeroth diffraction order and a first diffraction order of light from the light source, wherein the zeroth diffraction order on the image sensor array forms a geometrical projection of the outline-of the aperture along the central ray, over at least a portion of the field of view,
   and wherein an aperture size, the image distance, and the air gap spacing cooperate with the diffraction grating to generate, for a laser light source, a light distribution wherein high-frequency image content from Fresnel diffraction within at least one diffraction order has features smaller than the aperture size,
   and wherein each pixel area on the image sensor array is less than 1% of the aperture light-transmitting area; and
   (d) a control logic processor in communication with the image sensor array and configured to provide a signal that identifies at least a wavelength range and an angular direction within the field of view for at least one of the light sources according to the corresponding light pattern.

2. The apparatus of claim 1 wherein the control logic processor is programmed with instructions to compare the intensity distribution of the zeroth diffraction order and the first diffraction order.

3. The apparatus of claim 1 wherein the control logic processor is further configured to identify a light source type according to the light pattern.

4. The apparatus of claim 1 wherein the diffraction grating is a 2D diffraction grating that produces diffraction orders distributed in two dimensions.

5. The apparatus of claim 1 wherein the diffraction grating is an amplitude grating.

6. The apparatus of claim 1 wherein the distance from the aperture to the image sensor array is less than two times a diagonal of the image sensor array.

7. The apparatus of claim 1 wherein the aperture and the diffraction grating are on a common substrate and wherein the diffraction grating includes a thin metal layer.

8. A laser beam detection apparatus comprising:
(a) an image sensor having an array of light sensing pixels arranged over an area and energizable to generate a 2D image of a field of view;
(b) an aperture, smaller in light-transmitting area than the image sensor array area and disposed to define, for one or more pixels in the array, a corresponding light path that extends from said pixel through a center of the aperture, through an air gap that extends up to the image sensor array, and to a position in the field of view having a corresponding azimuth and elevation angle;
(c) a diffraction grating disposed in the light path and configured to form, on the image sensor array, for a laser directing light along the light path, a diffraction pattern having at least a zero diffraction order that is a lensless geometric projection of the outline of the aperture, over at least a portion of the field of view, and a first diffraction order,
wherein the diffraction pattern includes high frequency image content from Fresnel diffraction within at least the first diffraction order for the laser light source,
and wherein each pixel area on the image sensor array is less than 1% of the aperture light-transmitting area; and
(d) a control logic processor in signal communication with the image sensor and configured to identify laser light according to the corresponding diffraction pattern.

9. The laser beam detection apparatus of claim 8, wherein the control logic processor is further configured to report angular direction and wavelength of a laser source along the light path.

10. The laser beam detection apparatus of claim 8, further comprising an up-conversion phosphor in the light path.

11. The laser beam detection apparatus of claim 8, wherein, for one or more positions in the field of view, the diffraction grating is configured to provide diffraction orders distributed in two dimensions from the laser light beam.

12. A method for characterization of a light source over a field of view, comprising:
(a) disposing an image sensor array at an image plane;
(b) spacing an aperture at a distance from the image plane over an air gap that is bounded at the image plane, wherein the aperture is disposed to define the field of view that contains the light source, wherein a light-transmitting area of the aperture is less than 10% of the area of the image sensor array;
(c) disposing a diffraction grating to form, on the image sensor array, an unfocused light pattern having at least a zeroth and a first diffraction order of light from a light path extending along a central ray from the light source, through the aperture, and to the image sensor array,
wherein the zeroth diffraction order light on the image sensor array is a geometric projection of the shape of the aperture along the central ray, over at least a portion of the field of view;
and wherein an area of each pixel on the image sensor array is less than 1% of the aperture light-transmitting area;
(d) identifying the shape and position of the light pattern formed on the image sensor array and associating the light pattern with the corresponding light source; and
(e) generating a signal indicative of light source spectral characteristics and angular direction according to the shape and position of the identified light pattern.

13. The method of claim 12 further comprising determining if the shape of a non-zero diffraction order in the light pattern is similar to the shape of the zeroth diffraction order.

14. The method of claim 12 further comprising determining the presence of a laser light source according to the identified pattern.

15. The laser beam detection apparatus of claim 8, wherein the image sensor is housed within a unit having at least one window, wherein both the aperture and the diffraction grating are formed on one of the windows, and wherein the at least one window is spaced apart from the image sensor by the air gap.

16. The method of claim 12 wherein the aperture, the diffraction grating, and a spacing to the image sensor are configured such that high frequency image content from Fresnel diffraction is generated in within at least one diffraction order of the light pattern.

17. The apparatus of claim 1 wherein, for each light source in the field of view, the zeroth diffraction order is incident on the image sensor array at the same incident angle as the corresponding light source incident at the aperture.

18. The apparatus of claim 1 wherein the high-frequency image content comprises concentric rings.

19. The laser beam detection apparatus of claim 8 wherein the high frequency image content has features smaller than the light-transmitting area of the aperture.

* * * * *